United States Patent
Suzuki et al.

(10) Patent No.: US 9,688,374 B2
(45) Date of Patent: *Jun. 27, 2017

(54) BOAT MANEUVERING SYSTEM

(71) Applicant: YAMAHA HATSUDOKI KABUSHIKI KAISHA, Shizuoka-ken (JP)

(72) Inventors: Takayoshi Suzuki, Shizuoka-Ken (JP); Noriyoshi Hiraoka, Shizuoka-Ken (JP); Akihiro Onoue, Shizuoka-Ken (JP); Atsushi Kumita, Shizuoka-Ken (JP); Yoshiaki Tasaka, Shizuoka-Ken (JP)

(73) Assignee: YAMAHA HATSUDOKI KABUSHIKI KAISHA, Shizuoka-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/840,807

(22) Filed: Aug. 31, 2015

(65) Prior Publication Data

US 2016/0096608 A1 Apr. 7, 2016

(30) Foreign Application Priority Data

Oct. 2, 2014 (JP) .................................. 2014-204191

(51) Int. Cl.
*B63H 20/14* (2006.01)
*B63H 20/12* (2006.01)
(Continued)

(52) U.S. Cl.
CPC ........... *B63H 20/14* (2013.01); *F02D 41/021* (2013.01); *G05D 1/0206* (2013.01);
(Continued)

(58) Field of Classification Search
CPC .. B63H 20/12; B63H 20/14; B63H 2025/028; B63H 21/21; B63H 21/213; G05D 1/0011; G05D 1/0206
(Continued)

(56) References Cited

U.S. PATENT DOCUMENTS 8,113,892 B1 * 2/2012 Gable .................... B63H 21/21
114/144 RE
8,944,865 B1 * 2/2015 Krabacher ............. B63H 21/21
440/1
(Continued)

FOREIGN PATENT DOCUMENTS

JP 2007-083767 A 4/2007
JP 2007-091014 A 4/2007
(Continued)

*Primary Examiner* — Atul Trivedi
(74) *Attorney, Agent, or Firm* — Rabin & Berdo, P.C.

(57) ABSTRACT

A boat maneuvering system includes a power source, a first operating device configured to operate the power source, a first controller configured to control the power source, a second controller configured to accept an operation instruction input from the first operating device and to output a control signal to the first controller, a first electric power line that connects the power source to a battery to convey electric power therebetween, a second electric power line that connects the second controller to the battery to convey electric power therebetween, a communication path that connects the first controller and the second controller to convey a signal therebetween, and a signal conversion portion provided on the communication path to electrically separate the first and second controllers.

23 Claims, 7 Drawing Sheets (51) Int. Cl.
  *B63H 21/21* (2006.01)
  *G05D 1/02* (2006.01)
  *F02D 41/02* (2006.01)
  *F02D 41/26* (2006.01)
  *B63H 25/02* (2006.01)

(52) U.S. Cl.
  CPC ...... *B63H 2025/026* (2013.01); *F02D 41/266* (2013.01); *F02D 2200/60* (2013.01); *F02D 2400/14* (2013.01)

(58) Field of Classification Search
  USPC ...................................................... 701/2, 21
  See application file for complete search history.

(56) References Cited

U.S. PATENT DOCUMENTS 9,440,724 B2 * 9/2016 Suzuki .................. B63H 25/42
2003/0092331 A1 * 5/2003 Okuyama ............... B63B 49/00
  440/84
2008/0119096 A1 * 5/2008 Ito ........................ B63H 21/213
  440/87
2009/0215334 A1 * 8/2009 Suzuki ................... B63H 20/14
  440/85
2010/0094490 A1 * 4/2010 Alston .................. B63H 21/17
  701/21
2013/0201316 A1 * 8/2013 Binder .................... H04L 67/12
  348/77
2016/0096611 A1 * 4/2016 Suzuki ................. G05D 1/0206
  701/2

FOREIGN PATENT DOCUMENTS

| | | |
|---|---|---|
| JP | 2010-048199 A | 3/2010 |
| JP | 2010-048200 A | 3/2010 |

* cited by examiner

FIG. 1

FIRST EMBODIMENT

SECOND EMBODIMENT

FIG.4

FIG.5 FIRST MODIFICATION

FIG.6 SECOND MODIFICATION

FIG.7 THIRD MODIFICATION

FIG.8 FOURTH MODIFICATION

FIG.9 FIFTH MODIFICATION

BOAT MANEUVERING SYSTEM

CROSS-REFERENCE TO RELATED APPLICATION

The application claims foreign priority benefits to Japanese patent application number JP2014-204191, filed Oct. 2, 2014 (entitled "Boat Maneuvering System," by Takayoshi Suzuki, Noriyoshi Hiraoka, Akihiro Onoue, Atsushi Kumita, and Yoshiaki Tasaka), which is hereby incorporated by reference in its entirety.

BACKGROUND OF THE INVENTION

Field of the Invention

The present invention relates to a boat maneuvering system.

Description of the Background Art

A boat maneuvering system is known in general. Such a boat maneuvering system is disclosed in Japanese Patent Laying-Open No. 2007-091014, for example.

The aforementioned Japanese Patent Laying-Open No. 2007-091014 discloses a boat maneuvering system including an outboard motor mounted on a boat body, an engine ECU (electronic control unit) that controls the outboard motor, a battery, a power supply cable that connects the outboard motor and the battery to convey electric power therebetween, a remote control unit configured to operate the outboard motor, a remote control ECU that accepts an operation instruction input from the remote control unit and outputs a control signal to the engine ECU, a power supply cable that connects the remote control ECU and the battery to convey electric power therebetween, and a communication line that connects the engine ECU and the remote control ECU to convey a signal therebetween.

In the boat maneuvering system according to the aforementioned Japanese Patent Laying-Open No. 2007-091014, the battery is connected to a starter motor of the outboard motor or an electrical component of the outboard motor to convey electric power thereto. Thus, as the number of electronic components that require the electric power of the battery is increased, the influence of a dielectric load, power generation noise, voltage fluctuations, etc. is increased, and hence it is preferable to further improve the reliability of a communication environment of the control signal.

SUMMARY OF THE INVENTION

The present invention relates to a boat maneuvering system including a power source, further improving the reliability of a communication environment of a control signal.

A boat maneuvering system according to a first aspect of the present invention includes a power source mounted on a boat body, a first controller that controls the power source, a battery provided on the boat body or the power source, a first electric power line that connects the power source and the battery to convey electric power therebetween, a first operating device configured to operate the power source, a second controller that accepts an operation instruction input from the first operating device and outputs a control signal to the first controller, a second electric power line that connects the second controller and the battery to convey electric power therebetween, a communication path that connects the first controller and the second controller to convey a signal therebetween, and a signal conversion portion provided on the communication path, including an optical converter that converts an electrical signal to an optical signal and an electrical converter that converts the optical signal to the electrical signal.

In this boat maneuvering system according to the first aspect, as hereinabove described, the signal conversion portion including the optical converter that converts the electrical signal to the optical signal and the electrical converter that converts the optical signal to the electrical signal is provided on the communication path, whereby electrical connection between the first controller that controls the power source and the second controller is disconnected (the signal is conveyed between the first controller and the second controller while the first controller and the second controller are electrically insulated from each other), and hence the influence of a dielectric load, power generation noise, voltage fluctuations, etc. on the control signal is significantly reduced or prevented even in the case where the number of electronic components is increased. Thus, in the boat maneuvering system including the power source, the reliability of a communication environment of the control signal is further improved.

The aforementioned boat maneuvering system according to the first aspect preferably further includes a first ground and a second ground different from each other, one of the optical converter and the electrical converter of the signal conversion portion connected to the first controller is preferably grounded to the first ground, and the other of the optical converter and the electrical converter of the signal conversion portion connected to the second controller is preferably grounded to the second ground. According to this structure, the ground of the first controller and the ground of the second controller are separated from each other, and hence roundabout electric power and the influence of load changes are effectively reduced or prevented. Consequently, the reliability of the control signal is effectively improved.

In the aforementioned boat maneuvering system according to the first aspect, a larger current preferably flows to the first electric power line than to the second electric power line. According to this structure, significant electric power is easily supplied from the battery to the power source through the first electrical power line when starting or driving the power source.

In the aforementioned boat maneuvering system according to the first aspect, the battery preferably includes a first battery and a second battery, the first controller and the power source are preferably connected to the first battery, and the second controller is preferably connected to the second battery. According to this structure, an electric power source of the first controller and the power source and an electric power source of the second controller are separated from each other, and hence the electrical connection between the first controller that controls the power source and the second controller is completely disconnected. Thus, the reliability of the communication environment of the control signal is more effectively improved.

In the aforementioned boat maneuvering system according to the first aspect, the first controller, the power source, and the second controller are preferably connected to the battery that is shared. According to this structure, an electric power source is shared between the first controller, the power source, and the second controller, whereby the electrical connection between the first controller that controls the power source and the second controller is disconnected by the signal conversion portion to further improve the reliability of the communication environment of the control signal while reducing the number of components.

In the aforementioned boat maneuvering system according to the first aspect, the first operating device and the second controller are preferably unitized. According to this structure, the structure is simplified by unitization, as compared with the case where the first operating device and the second controller are provided separately.

In this case, the first operating device preferably includes a remote controller. According to this structure, the reliability of the control signal between the second controller unitized in the remote controller configured to operate at least one of the shift and output of the power source and the first controller is improved.

In the aforementioned boat maneuvering system according to the first aspect, the signal conversion portion preferably includes a photocoupler. According to this structure, the electrical connection between the first controller and the second controller is easily disconnected.

In the aforementioned boat maneuvering system according to the first aspect, the signal conversion portion is preferably arranged on the same circuit board as the first controller or the second controller. According to this structure, no circuit board configured to arrange the signal conversion portion may be provided separately, and hence the structure is simplified.

The aforementioned boat maneuvering system according to the first aspect preferably further includes a second operating device provided separately from the first operating device in the communication path, and the signal conversion portion is preferably integrally provided in the second operating device. According to this structure, a boat is maneuvered using the second operating device provided separately from the first operating device, and hence the reliability of the control signal is improved while improving the convenience of boat maneuvering.

In this case, the second operating device preferably includes a joystick. According to this structure, the boat is easily maneuvered using the joystick while improving the reliability of the control signal.

In the aforementioned boat maneuvering system according to the first aspect, the signal conversion portion preferably further includes an optical fiber that guides the optical signal generated from the optical converter to the electrical converter. According to this structure, even in the case where a distance between the optical converter and the electrical converter is increased, light generated by the optical converter reliably reaches the electrical converter by the optical fiber.

A boat maneuvering system according to a second aspect of the present invention includes a first power source and a second power source mounted on a boat body, a first battery, a second battery, and a third battery provided on the boat body, the first power source, or the second power source, a first controller that controls the first power source, a first electric power line that connects the first power source and the first battery to convey electric power therebetween, a second controller that controls the second power source, a second electric power line that connects the second power source and the second battery to convey electric power therebetween, a first operating device configured to operate the first power source and the second power source, a third controller that accepts an operation instruction input from the first operating device and outputs control signals to the first controller and the second controller, a third electric power line that connects the third controller and the third battery to convey electric power therebetween, a first communication path that connects the first controller and the third controller to convey a signal therebetween, a second communication path that connects the second controller and the third controller to convey a signal therebetween, a first signal conversion portion provided on the first communication path, including an optical converter that converts an electrical signal to an optical signal and an electrical converter that converts the optical signal to the electrical signal, and a second signal conversion portion provided on the second communication path, including an optical converter that converts an electrical signal to an optical signal and an electrical converter that converts the optical signal to the electrical signal.

In this boat maneuvering system according to the second aspect, as hereinabove described, the first signal conversion portion and the second signal conversion portion each including the optical converter that converts the electrical signal to the optical signal and the electrical converter that converts the optical signal to the electrical signal are provided on the first communication path and the second communication path, respectively, whereby electrical connection between both the first controller that controls the first power source and the second controller that controls the second power source and the third controller is disconnected, and hence the influence of a dielectric load, power generation noise, voltage fluctuations, etc. on the control signals is significantly reduced or prevented even in the case where the number of electronic components is increased. Thus, in the boat maneuvering system including a plurality of power sources, the reliability of communication environments of the control signals is further improved.

The aforementioned boat maneuvering system according to the second aspect preferably further includes a first ground, a second ground, and a third ground different from each other, one of the optical converter and the electrical converter of the first signal conversion portion connected to the first controller is preferably grounded to the first ground, the other of the optical converter and the electrical converter of the first signal conversion portion connected to the third controller is preferably grounded to the third ground, one of the optical converter and the electrical converter of the second signal conversion portion connected to the second controller is preferably grounded to the second ground, and the other of the optical converter and the electrical converter of the second signal conversion portion connected to the third controller is preferably grounded to the third ground. According to this structure, the ground of the first controller and the ground of the third controller are separated from each other while the ground of the second controller and the ground of the third controller are separated from each other, and hence roundabout electric power and the influence of load changes are effectively reduced or prevented. Consequently, the reliability of the control signals is effectively improved.

In the aforementioned boat maneuvering system according to the second aspect, larger currents preferably flow to the first electric power line and the second electric power line than to the third electric power line. According to this structure, significant electric power is easily supplied from the batteries to the first power source and the second power source through the first electrical power line and the second electrical power line when starting or driving the power sources.

In the aforementioned boat maneuvering system according to the second aspect, the third battery is preferably shared as at least one of the first battery and the second battery. According to this structure, an electric power source of the third controller is shared as an electric power source of the first controller or the second controller, whereby the electrical connection between both the first controller and the second controller and the third controller is disconnected by the signal conversion portions to further improve the reliability of the communication environments of the control signals while reducing the number of components.

In the aforementioned boat maneuvering system according to the second aspect, the first operating device and the third controller are preferably unitized. According to this structure, the structure is simplified by unitization, as compared with the case where the first operating device and the third controller are provided separately.

In this case, the first operating device preferably includes a remote controller. According to this structure, the reliability of the control signals between the third controller unitized in the remote controller configured to operate at least one of the shifts and outputs of the power sources and both the first controller and the second controller is improved.

In the aforementioned boat maneuvering system according to the second aspect, the first signal conversion portion and the second signal conversion portion each preferably include a photocoupler. According to this structure, the electrical connection between both the first controller and the second controller and the third controller is easily disconnected.

In the aforementioned boat maneuvering system according to the second aspect, the first signal conversion portion is preferably arranged on the same circuit board as the first controller or the third controller, and the second signal conversion portion is preferably arranged on the same circuit board as the second controller or the third controller. According to this structure, no circuit board configured to arrange the first signal conversion portion and the second signal conversion portion may be provided separately, and hence the structure is simplified.

The aforementioned boat maneuvering system according to the second aspect preferably further includes a second operating device provided separately from the first operating device, interposed in at least one of the first communication path and the second communication path, and at least one of the first signal conversion portion and the second signal conversion portion is preferably integrally provided in the second operating device. According to this structure, a boat is maneuvered using the second operating device provided separately from the first operating device, and hence the reliability of the control signals is improved while improving the convenience of boat maneuvering.

In this case, the second operating device preferably includes a joystick. According to this structure, the boat is easily maneuvered using the joystick while improving the reliability of the control signals.

In the aforementioned boat maneuvering system according to the second aspect, the first signal conversion portion and the second signal conversion portion each preferably further include an optical fiber that guides the optical signal generated from the optical converter to the electrical converter. According to this structure, even in the case where a distance between the optical converter and the electrical converter is increased, light generated by the optical converter reliably reaches the electrical converter by the optical fiber.

The foregoing and other objects, features, aspects, and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a boat maneuvering system 100 according to a first embodiment of the present invention is now described with reference to FIGS. 1 and 2. In the figures, arrow FWD represents the forward movement direction of a boat, and arrow BWD represents the reverse movement direction of the boat. Furthermore, in the figures, arrow R represents the starboard direction of the boat, and arrow L represents the portside direction of the boat.

Figure 1:
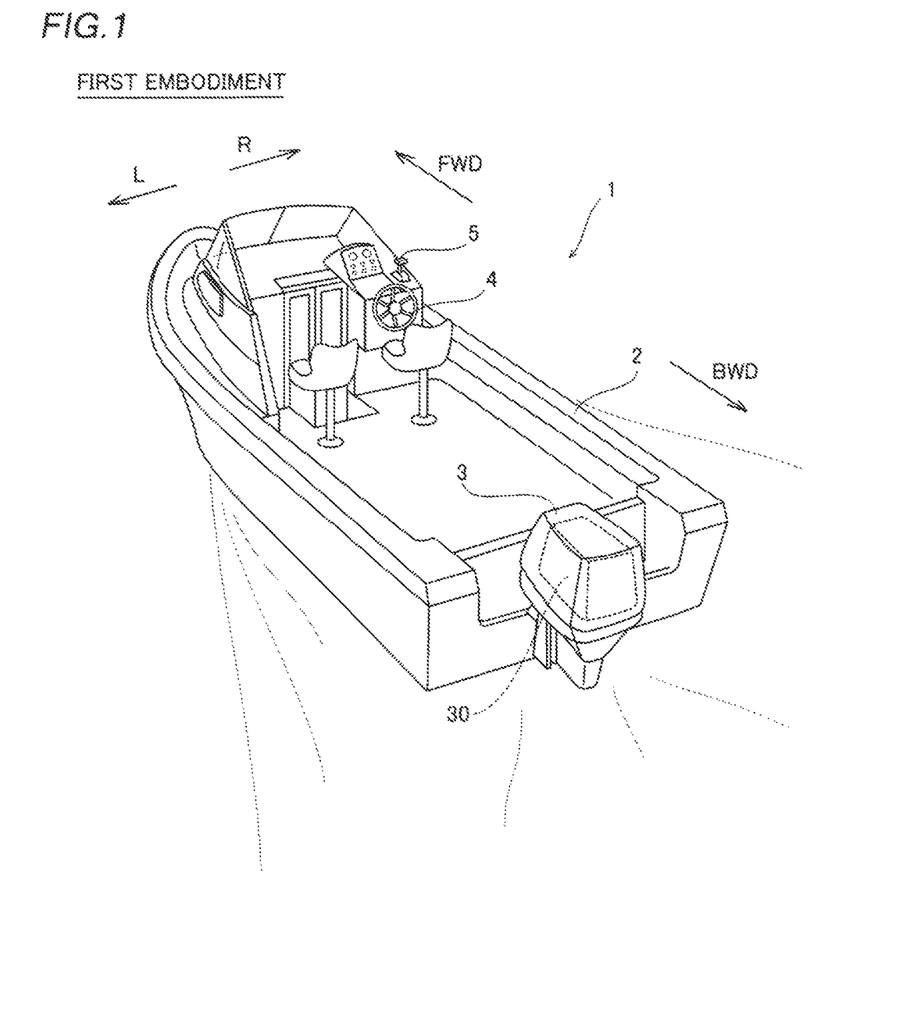
FIG. 1 is a perspective view showing a boat including a boat maneuvering system according to a first embodiment of the present invention.

The boat maneuvering system 100 (see FIG. 2) is provided to maneuver a boat 1 shown in FIG. 1. The boat 1 is provided with a boat body 2, an outboard motor 3 mounted on a rear portion of the boat body 2, configured to propel the boat body 2, a steering wheel 4 configured to steer the boat body 2 (turn the outboard motor 3), and a remote controller 5 configured to operate the shift and output (throttle position) of the outboard motor 3, as shown in FIG. 1. The boat 1 includes a battery 6 and a communication path 7, as shown in FIG. 2. The outboard motor 3 is an example of the "power source" in the present invention, and the remote controller 5 is an example of the "first operating device" in the present invention.

The single outboard motor 3 is mounted on the rear portion of the boat body 2. The outboard motor 3 includes an engine 30. The outboard motor 3 is arranged to extend to below the engine 30 and includes a drive shaft that conveys the drive force of the engine 30, one propeller shaft that extends in a direction orthogonal to (intersecting with) the drive shaft, and one propeller mounted on a rear end portion of the propeller shaft, rotated together with the propeller shaft.

Figure 2:
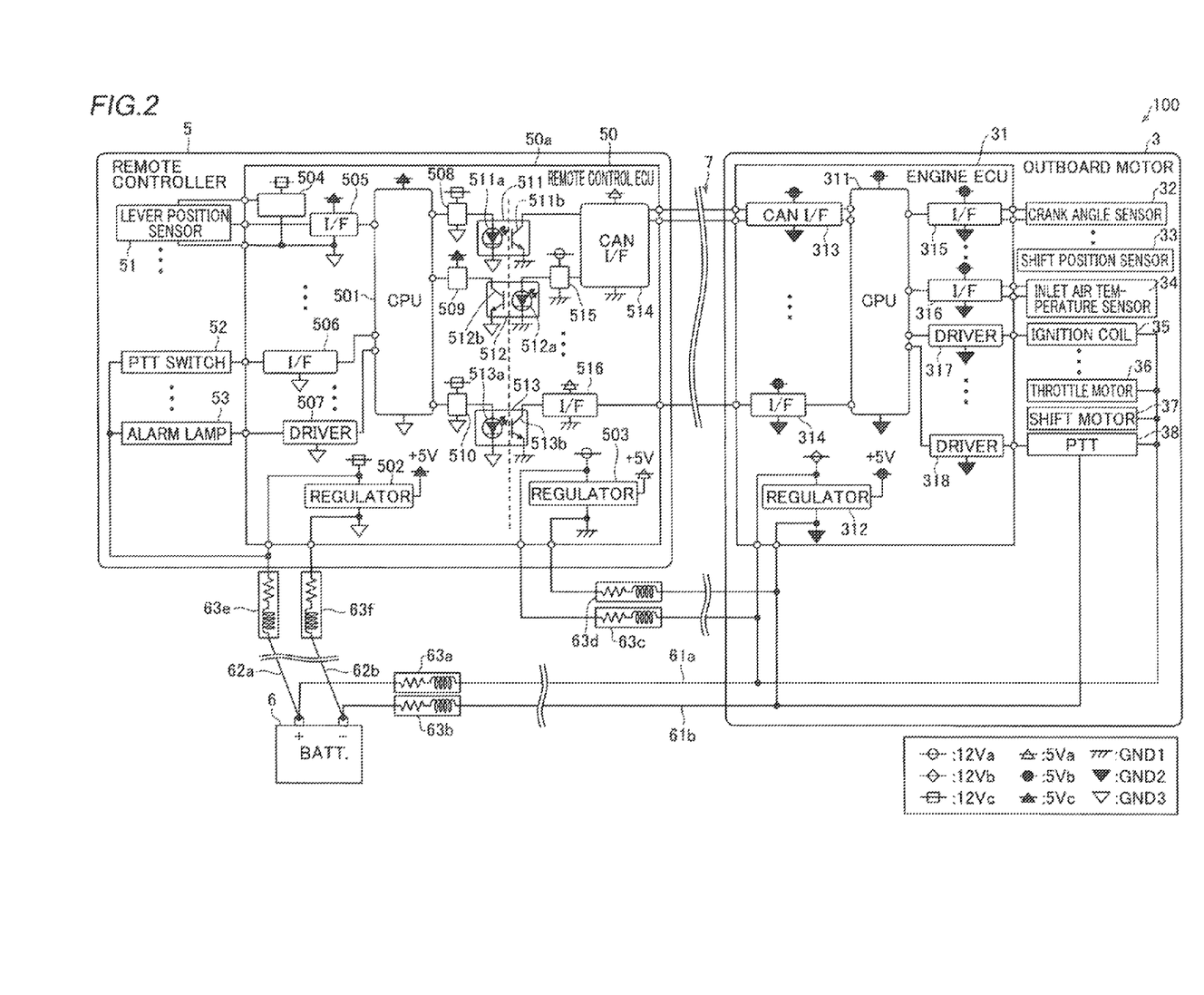
FIG. 2 is a circuit diagram schematically showing the boat maneuvering system according to the first embodiment of the present invention.

The outboard motor 3 includes an engine ECU (electronic control unit) 31, a crank angle sensor 32, a shift position sensor 33, an inlet air temperature sensor 34, an ignition coil 35, a throttle motor 36, a shift motor 37, and a PTT (power trim tilt) 38 as the control structure, as shown in FIG. 2. The engine ECU 31 is an example of the "first controller" in the present invention.

The engine ECU 31 includes a CPU (central processing unit) 311, a regulator 312, a CAN (controller area network) I/F (interface) 313, I/Fs 314, 315, and 316, and drivers 317 and 318.

The remote controller 5 includes a remote control ECU (electronic control unit) 50, a lever position sensor 51, a PTT switch 52, and an alarm lamp 53 as the control structure, as shown in FIG. 2. In other words, the remote controller 5 and the remote control ECU 50 are unitized. The remote controller 5 is mounted in the vicinity of an operator's seat located in a front portion of the boat 2.

The remote control ECU 50 includes a CPU 501, regulators 502 and 503, a power supply circuit 504, I/Fs 505 and 506, drivers 507 and 508, an I/F 509, a driver 510, photocouplers 511, 512, and 513, a CAN I/F 514, a driver 515, and an I/F 516. The CPU 501 is an example of the "second controller" in a first aspect of the present invention, and the photocouplers 511 to 513 are examples of the "signal conversion portion," or the "signal converter," in the present invention.

In an example of a circuit shown in FIG. 2, positive potentials and negative (ground) potentials that are equal to each other are represented by the same symbols. Specifically, potentials of about 12 V based on the potential of the battery 6 that is about 12 V include three lines (three types) of 12Va, 12Vb, and 12Vc. Potentials reduced to about 5 V by each regulator include three lines (three types) of 5Va, 5Vb, and 5Vc. Grounds connected to a minus terminal of the battery 6 include three lines (three types) of GND1, GND2, and GND3. Potentials in portions shown by the same symbols in the figure are substantially equal to each other. These potentials are varied according to the load, resistance, etc. of electronic components connected thereto. For example, 12Va, 12Vb, and 12Vc may be different from each other.

The engine ECU 31 of the outboard motor 3 controls each portion of the outboard motor 3. Specifically, the engine ECU 31 (CPU 311) receives a signal based on an operation of the remote controller 5 from the remote control ECU 50 and controls each portion of the outboard motor 3. More specifically, the engine ECU 31 detects the rotation angle of the engine 30 on the basis of a detection result of the crank angle sensor 32. The engine ECU 31 acquires a shift position (forward movement, reverse movement, and neutral) on the basis of a detection result of the shift position sensor 33. The engine ECU 31 acquires the temperature of air drawn into the engine 30 on the basis of a detection result of the inlet air temperature sensor 34.

The engine ECU 31 controls the ignition timing of the ignition coil 35 to ignite the engine 30. The engine ECU 31 controls the throttle motor 36 to adjust the throttle position. The engine ECU 31 controls the shift motor 37 to move the shift. The engine ECU 31 controls the PTT 38 to adjust the trim and tilt of the outboard motor 3.

The engine ECU 31 is connected to the battery 6 such that electric power is conveyed to the engine ECU 31. Specifically, the engine ECU 31 is connected to a plus terminal of the battery 6 by an electric power line 61a and is connected to the minus terminal (ground) of the battery 6 by an electric power line 61b. The potential of the plus terminal connected to the engine ECU 31 is varied from the potential of the battery 6 to 12Vb by an impedance 63a and the flowing current of the electric power line 61a. The potential of the minus terminal (ground) connected to the engine ECU 31 is varied from the potential of the battery 6 to GND2 by an impedance 63b and the flowing current of the electric power line 61b. The supplied potential of 12Vb is reduced to 5Vb by the regulator 312.

The CPU 311 is communicatively connected to the CAN I/F 313, the I/Fs 314 to 316, and the drivers 317 and 318. The CPU 311 is connected to a potential of 5Vb and a potential of GND2.

The CAN I/F 313 transmits and receives a signal of CAN communication (control area network communication). In other words, the CAN I/F 313 receives a CAN signal from the remote control ECU 50 and transmits a signal to the CPU 311. The CAN I/F 313 receives a signal from the CPU 311 and transmits a CAN signal to the remote control ECU 50. The CAN I/F 313 is connected to a potential of 5Vb and a potential of GND2.

The I/F 314 receives a wake-up signal (activation signal) from the remote control ECU 50 and transmits a signal to the CPU 311. The I/F 314 is connected to a potential of 5Vb and a potential of GND2. The I/F 315 receives a signal containing crank angle information from the crank angle sensor 32 and transmits a signal to the CPU 311. The I/F 315 is connected to a potential of 5Vb and a potential of GND2. The I/F 316 receives a signal containing crank angle information from the inlet air temperature sensor 34 and transmits a signal to the CPU 311. The I/F 316 is connected to a potential of 5Vb and a potential of GND2.

The driver 317 receives a signal from the CPU 311 and drives the ignition coil 35. The driver 317 is connected to a potential of GND2. The driver 318 receives a signal from the CPU 311 and drives the PTT 38. The driver 318 is connected to a potential of GND2.

The remote controller 5 is provided to operate the outboard motor 3. The remote control ECU 50 of the remote controller 5 controls each portion of the remote controller 5. Specifically, the remote control ECU 50 (CPU 501) outputs a control signal to the engine ECU 31 of the outboard motor 3 on the basis of an operation of a user on the remote controller 5. More specifically, the remote control ECU 50 detects the lever position of the remote controller 5 on the basis of a detection result of the lever position sensor 51. The remote control ECU 50 acquires operated tilt and trim on the basis of an operation of the user on the PTT switch 52. The remote control ECU 50 illuminates the alarm lamp 53 on the basis of the presence or absence of malfunction.

The remote control ECU 50 is connected to the battery 6 such that electric power is conveyed to the remote control ECU 50. Specifically, the remote control ECU 50 is connected to the plus terminal of the battery 6 by electric power lines 61a and 62a and is connected to the minus terminal (ground) of the battery 6 by electric power lines 61b and 62b. A positive potential connected to a portion of the remote control ECU 50 including the CAN I/F 514 with respect to the photocouplers 511 to 513 is varied from the potential of the battery 6 to 12Va by impedances 63a and 63c and the flowing current of the electric power line 61a. A negative (ground) potential connected to the portion of the remote control ECU 50 including the CAN I/F 514 with respect to the photocouplers 511 to 513 is varied from the potential of the battery 6 to GND1 by impedances 63b and 63d and the flowing current of the electric power line 61b. The supplied potential of 12Va is reduced to 5Va by the regulator 503.

A positive potential connected to a portion of the remote control ECU 50 including the CPU 501 with respect to the photocouplers 511 to 513 is varied from the potential of the battery 6 to 12Vc by an impedance 63e and the flowing current of the electric power line 62a. A negative (ground) potential connected to the portion of the remote control ECU 50 including the CPU 501 with respect to the photocouplers 511 to 513 is varied from the potential of the battery 6 to GND3 by an impedance 63f and the flowing current of the electric power line 62b. The supplied potential of 12Vc is reduced to 5Vc by the regulator 502.

The remote control ECU 50 is provided on a circuit board 50a. In other words, the CPU 501 and the photocouplers 511 to 513 are arranged on the same circuit board 50a.

The CPU 501 is connected to the engine ECU 31 (CPU 311) of the outboard motor 3 by the communication path 7 to convey a signal thereto. The communication path 7 accommodates CAN communication. In the CAN communication, a signal is transmitted and received by a differential voltage using two communication lines.

The CPU 501 is communicatively connected to the I/Fs 505 and 506, the drivers 507 and 508, the I/F 509, and the driver 510. The CPU 501 is connected to a potential of 5Vc and a potential of GND3.

The power supply circuit 504 supplies electric power to the lever position sensor 51. The power supply circuit 504 is connected to a potential of 12Vc and a potential of GND3. The I/F 505 receives a signal containing lever position information from the lever position sensor 51 and transmits a signal to the CPU 501. The I/F 505 is connected to a potential of 5Vc and a potential of GND3. The I/F 506 receives a signal from the PTT switch 52 and transmits a signal to the CPU 501. The I/F 506 is connected to a potential of GND3.

The driver 507 receives a signal from the CPU 501 and drives (illuminates) the alarm lamp 53. The driver 507 is connected to a potential of GND3. The driver 508 receives a signal from the CPU 501 and drives an optical converter 511a of the photocoupler 511. The driver 508 is connected to a potential of 12Vc and a potential of GND3. The I/F 509 receives a signal from an electrical converter 512b of the photocoupler 512 and transmits a signal to the CPU 501. The I/F 509 is connected to a potential of 5Vc.

The driver 510 receives a signal from the CPU 501 and drives an optical converter 513a of the photocoupler 513. The driver 510 is connected to a potential of 12Vc and a potential of GND3.

According to the first embodiment, the photocouplers 511, 512, and 513 are provided on the communication path that connects the CPU 501 of the remote control ECU 50 and the engine ECU 31 to convey a signal therebetween. In other words, the communication path that connects the CPU 501 and the engine ECU 31 conveys a signal while the CPU 501 and the engine ECU 31 are electrically separated (insulated) from each other by the photocouplers 511, 512, and 513. The photocouplers 511, 512, and 513 include optical converters 511a, 512a, and 513a that convert electrical signals to optical signals and electrical converters 511b, 512b, and 513b that convert optical signals to electrical signals, respectively.

The photocoupler 511 outputs a signal from the CPU 501 to the CAN I/F 514. Specifically, the optical converter 511a converts an electrical signal output through the driver 508 from the CPU 501 to an optical signal. Then, the electrical converter 511b receives the optical signal output from the optical converter 511a, converts the optical signal to an electrical signal again, and outputs the electrical signal to the CAN I/F 514. The optical converter 511a of the photocoupler 511 connected to the CPU 501 is grounded (connected) to a potential of GND3. On the other hand, the electrical converter 511b of the photocoupler 511 connected to the engine ECU 31 is grounded (connected) to a potential of GND1.

The photocoupler 512 outputs a signal from the CAN I/F 514 to the CPU 501. Specifically, the optical converter 512a converts an electrical signal output through the driver 515 from the CAN I/F 514 to an optical signal. Then, the electrical converter 512b receives the optical signal output from the optical converter 512a, converts the optical signal to an electrical signal again, and outputs the electrical signal to the CPU 501 through the I/F 509. The electrical converter 512b of the photocoupler 512 connected to the CPU 501 is grounded (connected) to a potential of GND3. On the other hand, the optical converter 512a of the photocoupler 512 connected to the engine ECU 31 is grounded (connected) to a potential of GND1.

The photocoupler 513 outputs a signal from the CPU 501 to the engine ECU 31. Specifically, the optical converter 513a converts an electrical signal output through the driver 510 from the CPU 501 to an optical signal. Then, the electrical converter 513b receives the optical signal output from the optical converter 513a, converts the optical signal to an electrical signal again, and outputs the electrical signal to the engine ECU 31 through the I/F 516. The optical converter 513a of the photocoupler 513 connected to the CPU 501 is grounded (connected) to a potential of GND3. On the other hand, the electrical converter 513b of the photocoupler 513 connected to the engine ECU 31 is grounded (connected) to a potential of GND1.

The CAN I/F 514 transmits and receives a signal of CAN communication (control area network communication). In other words, the CAN I/F 514 receives a CAN signal from the engine ECU 31 and transmits a signal to the CPU 501. The CAN I/F 514 receives a signal from the CPU 501 and transmits a CAN signal to the engine ECU 31. The CAN I/F 514 is connected to a potential of 5Va and a potential of GND1.

The driver 515 receives a signal from the CAN I/F 514 and drives the optical converter 512a of the photocoupler 512. The driver 515 is connected to a potential of 12Va and a potential of GND1. The I/F 516 receives a signal from the electrical converter 513b of the photocoupler 513 and transmits the signal to the engine ECU 31. The I/F 516 is connected to a potential of 5Va and a potential of GND1.

The battery 6 is provided on the boat body 2 or the outboard motor 3. The battery 6 is connected with the electric power lines 61a and 61b configured to supply electric power to the outboard motor 3 and the remote control ECU 50 and the electric power lines 62a and 62b configured to supply electric power to the remote controller 5. Larger currents flow to the electric power lines 61a and 61b than to the electric power lines 62a and 62b. The electric power lines 61a and 61b are examples of the "first electric power line" in the first aspect of the present invention, and the electric power lines 62a and 62b are examples of the "second electric power line" in the first aspect of the present invention.

According to the aforementioned first embodiment, the following effects are obtained.

According to the first embodiment, as hereinabove described, the photocouplers 511, 512, and 513 including the optical converters 511a, 512a, and 513a that convert electrical signals to optical signals and the electrical converters 511b, 512b, and 513b that convert optical signals to electrical signals, respectively, are provided on the communication path 7, whereby electrical connection between the engine ECU 31 that controls the outboard motor 3 and the CPU 501 of the remote controller 5 is disconnected, and hence the influence of a dielectric load, power generation noise, voltage fluctuations, etc. on the control signal is significantly reduced or prevented even in the case where the number of electronic components is increased. Thus, in the boat maneuvering system 100 including the power source, the reliability of a communication environment of the control signal is further improved.

According to the first embodiment, as hereinabove described, the electrical converter 511b of the photocoupler 511, the optical converter 512a of the photocoupler 512, and the electrical converter 513b of the photocoupler 513 are grounded to the grounds (the potentials of GND1), and the optical converter 511a of the photocoupler 511, the electrical converter 512b of the photocoupler 512, and the optical converter 513a of the photocoupler 513 are grounded to the grounds (the potentials of GND3). Thus, the grounds (the potentials of GND1) connected to the engine ECU 31 and the grounds (the potentials of GND3) connected to the CPU 501 of the remote controller 5 are separated from each other, and hence roundabout current and the influence of load changes are effectively reduced or prevented. Consequently, the reliability of the control signal is effectively improved.

According to the first embodiment, as hereinabove described, larger currents flow to the electric power lines 61a and 61b than to the electric power lines 62a and 62b. Thus, significant electric power is easily supplied from the battery 6 to the outboard motor 3 through the electrical power lines 61a and 61b when starting or driving the outboard motor 3.

According to the first embodiment, as hereinabove described, the engine ECU 31 of the outboard motor 3 and the CPU 501 of the remote controller 5 are connected to the shared battery 6. Thus, an electric power source is shared between the engine ECU 31, the outboard motor 3, and the CPU 501 of the remote controller 5, whereby the electrical connection between the engine ECU 31 that controls the outboard motor 3 and the CPU 501 is disconnected by the signal conversion portion to further improve the reliability of the communication environment of the control signal while reducing the number of components.

According to the first embodiment, as hereinabove described, the remote controller 5 and the CPU 501 are unitized. Thus, the structure is simplified by unitization, as compared with the case where the remote controller 5 and the CPU 501 are provided separately.

According to the first embodiment, as hereinabove described, the photocouplers 511, 512, and 513 are arranged on the same circuit board 50a as the CPU 501. Thus, no circuit board configured to arrange the photocouplers 511, 512, and 513 may be provided separately, and hence the structure is simplified.

Second Embodiment

A second embodiment of the present invention is now described with reference to FIGS. 3 and 4. In this second embodiment, two outboard motors are provided, unlike the aforementioned first embodiment in which the single outboard motor is provided. Portions similar to those of the boat maneuvering system 100 according to the first embodiment are denoted by the same reference numerals.

Figure 3:
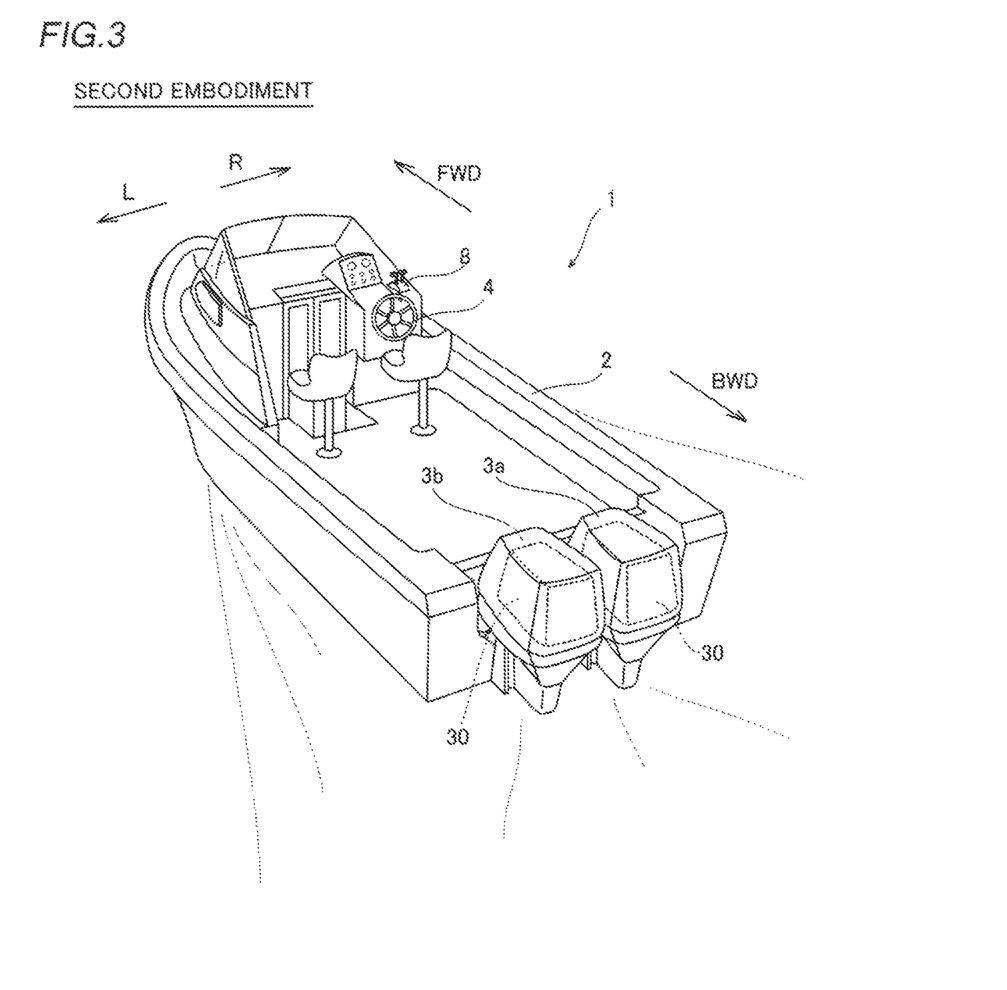
FIG. 3 is a perspective view showing a boat including a boat maneuvering system according to a second embodiment of the present invention.

According to the second embodiment, a boat maneuvering system 200 (see FIG. 4) is provided to maneuver a boat 1 shown in FIG. 3. The boat 1 is provided with a boat body 2, two outboard motors 3a and 3b mounted on a rear portion of the boat body 2, configured to propel the boat body 2, a steering wheel 4 configured to steer the boat body 2 (turn the outboard motors 3a and 3b), and a remote controller 8 configured to operate the shift and output (throttle position) of the outboard motors 3a and 3b, as shown in FIG. 3. The boat 1 includes batteries 6a, 6b, and 6c, communication paths 9a and 9b, a hub 10, and an indicator 11, as shown in FIG. 4. The outboard motors 3a and 3b are examples of the "first power source" and the "second power source" in the present invention, respectively. The batteries 6a, 6b, and 6c are examples of the "first battery", the "second battery", and the "third battery" in the present invention, respectively, and the remote controller 8 is an example of the "first operating device" in the present invention. The communication paths 9a and 9b are examples of the "first communication path" and the "second communication path" in the present invention, respectively.

The outboard motors 3a and 3b each have the same structure as the outboard motor 3 according to the first embodiment. In other words, the outboard motor 3a (3b) includes an engine ECU (electronic control unit) 31a (31b), a crank angle sensor 32, a shift position sensor (not shown), an inlet air temperature sensor (not shown), an ignition coil (not shown), a throttle motor (not shown), a shift motor (not shown), and a PTT (power trim tilt) 38 as the control structure, as shown in FIG. 4. The engine ECUs 31a and 31b are examples of the "first controller" and the "second controller" in a second aspect of the present invention, respectively.

Figure 4:
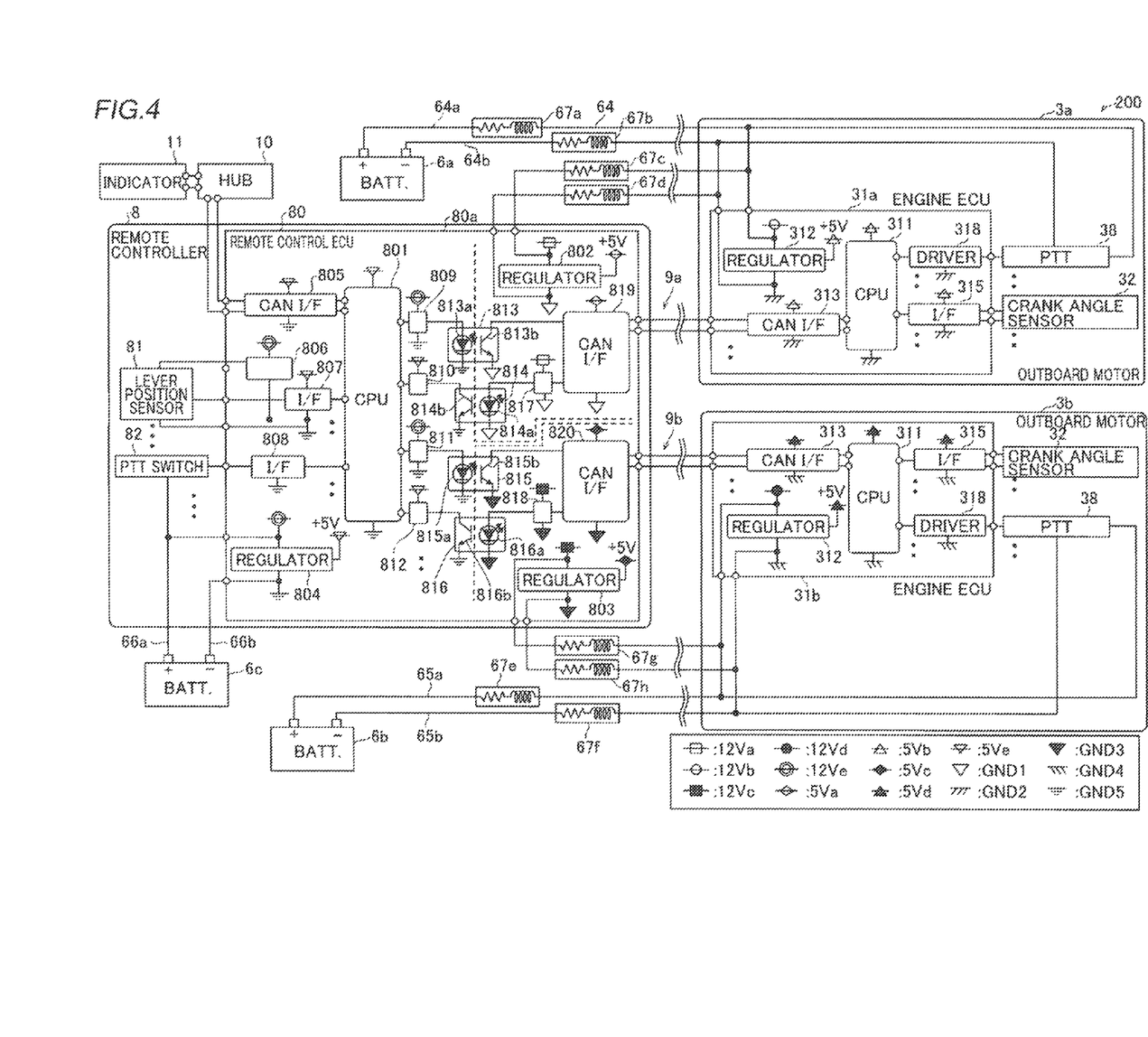
FIG. 4 is a circuit diagram schematically showing the boat maneuvering system according to the second embodiment of the present invention.

The remote controller 8 includes a remote control ECU (electronic control unit) 80, a lever position sensor 81, and a PTT switch 82 as the control structure, as shown in FIG. 4. In other words, the remote controller 8 and the remote control ECU 80 are unitized.

The remote control ECU 80 includes a CPU 801, regulators 802, 803, and 804, a CAN I/F 805, a power supply circuit 806, I/Fs 807 and 808, a driver 809, an I/F 810, a driver 811, an I/F 812, photocouplers 813, 814, 815, and 816, drivers 817 and 818, and CAN I/Fs 819 and 820. The CPU 801 is an example of the "third controller" in the second aspect of the present invention. The photocouplers 813 and 814 are examples of the "first signal conversion portion," or the "first signal converter," in the present invention, and the photocouplers 815 and 816 are examples of the "second signal conversion portion," or the "second signal converter," in the present invention.

In an example of a circuit shown in FIG. 4, positive potentials and negative (ground) potentials that are equal to each other are represented by the same symbols. Specifically, potentials of about 12 V based on the potential of the battery 6a that is about 12 V include two lines (two types) of 12Va and 12Vb. Potentials of about 12 V based on the potential of the battery 6b that is about 12 V include two lines (two types) of 12Vc and 12Vd. Potentials of about 12 V based on the potential of the battery 6c that is about 12 V include one line (one type) of 12Ve. Potentials reduced to about 5 V by each regulator include five lines (five types) of 5Va, 5Vb, 5Vc, 5Vd, and 5Ve. Grounds connected to a minus terminal of the battery 6a include two lines (two types) of GND1 and GND2. Grounds connected to a minus terminal of the battery 6b include two lines (two types) of GND3 and GND4. Grounds connected to a minus terminal of the battery 6c include one line (one type) of GND5. Potentials in portions shown by the same symbols in the figure are substantially equal to each other. These potentials are varied according to the load, resistance, etc. of electronic components connected thereto. For example, 5Va, 5Vb, 5Vc, 5Vd, and 5Ve may be different from each other.

The battery 6a (6b) is provided on the boat body 2 or the outboard motor 3a (3b). The battery 6c is provided on the boat body 2. The battery 6a is connected with electric power lines 64a and 64b configured to supply electric power to the outboard motor 3a and the remote control ECU 80. The battery 6b is connected with electric power lines 65a and 65b configured to supply electric power to the outboard motor 3b and the remote control ECU 80. The battery 6c is connected with electric power lines 66a and 66b configured to supply electric power to the remote control ECU 80. Larger currents flow to the electric power lines 64a, 64b, 65a, and 65b than to the electric power lines 66a and 66b. The electric power lines 64a and 64b are examples of the "first electric power line" in the second aspect of the present invention, and the electric power lines 65a and 65b are examples of the "second electric power line" in the second aspect of the present invention. The electric power lines 66a and 66b are examples of the "third electric power line" in the second aspect of the present invention.

The battery 6a is connected to the engine ECU 31a through the electric power lines 64a and 64b. Specifically, the engine ECU 31a is connected to a plus terminal of the battery 6a by the electric power line 64a and is connected to a minus terminal (ground) of the battery 6a by the electric power line 64b. A positive potential connected to the engine ECU 31a is varied from the potential of the battery 6a to 12Vb by an impedance 67a and the flowing current of the electric power line 64a. A negative (ground) potential connected to the engine ECU 31a is varied from the potential of the battery 6a to GND2 by an impedance 67b and the flowing current of the electric power line 64b. The supplied potential of 12Vb is reduced to 5Vb by a regulator 312.

The battery 6a is connected to the remote control ECU 80 through the electric power lines 64a and 64b. Specifically, a portion of the remote control ECU 80 including the CAN I/F 819 with respect to the photocouplers 813 and 814 is connected to the plus terminal of the battery 6a by the electric power line 64a and is connected to the minus terminal (ground) of the battery 6a by the electric power line 64b. A positive potential connected to the portion of the remote control ECU 80 including the CAN I/F 819 with respect to the photocouplers 813 and 814 is varied from the potential of the battery 6a to 12Va by impedances 67a and 67c and the flowing current of the electric power line 64a. A negative (ground) potential connected to the portion of the remote control ECU 80 including the CAN I/F 819 with respect to the photocouplers 813 and 814 is varied from the potential of the battery 6a to GND1 by impedances 67b and 67d and the flowing current of the electric power line 64b. The supplied potential of 12Va is reduced to 5Va by the regulator 802.

The battery 6b is connected to the engine ECU 31b through the electric power lines 65a and 65b. Specifically, the engine ECU 31b is connected to a plus terminal of the battery 6b by the electric power line 65a and is connected to a minus terminal (ground) of the battery 6b by the electric power line 65b. A positive potential connected to the engine ECU 31b is varied from the potential of the battery 6b to 12Vd by an impedance 67e and the flowing current of the electric power line 65a. A negative (ground) potential connected to the engine ECU 31b is varied from the potential of the battery 6b to GND4 by an impedance 67f and the flowing current of the electric power line 65b. The supplied potential of 12Vd is reduced to 5Vd by the regulator 312.

The battery 6b is connected to the remote control ECU 80 through the electric power lines 65a and 65b. Specifically, a portion of the remote control ECU 80 including the CAN I/F 820 with respect to the photocouplers 815 and 816 is connected to the plus terminal of the battery 6b by the electric power line 65a and is connected to the minus terminal (ground) of the battery 6b by the electric power line 65b. A positive potential connected to the portion of the remote control ECU 80 including the CAN I/F 820 with respect to the photocouplers 815 and 816 is varied from the potential of the battery 6b to 12Vc by impedances 67e and 67g and the flowing current of the electric power line 65a. A negative (ground) potential connected to the portion of the remote control ECU 80 including the CAN I/F 820 with respect to the photocouplers 815 and 816 is varied from the potential of the battery 6b to GND3 by impedances 67f and 67h and the flowing current of the electric power line 65b. The supplied potential of 12Vc is reduced to 5Vc by the regulator 803.

The battery 6c is connected to the remote controller 8 through the electric power lines 66a and 66b. Specifically, the battery 6c is connected to a portion of the remote control ECU 80 including the CPU 801 with respect to the photocouplers 813 to 816. A positive potential connected to the portion of the remote control ECU 80 including the CPU 801 with respect to the photocouplers 813 to 816 is 12Ve. A negative (ground) potential connected to the portion of the remote control ECU 80 including the CPU 801 with respect to the photocouplers 813 to 816 is GND5. The supplied potential of 12Ve is reduced to 5Ve by the regulator 804.

The remote controller 8 is provided to operate the outboard motors 3a and 3b. The remote control ECU 80 of the remote controller 8 controls each portion of the remote controller 8. Specifically, the remote control ECU 80 (CPU 801) outputs control signals to the engine ECUs 31a and 31b of the outboard motors 3a and 3b on the basis of an operation of a user on the remote controller 8. More specifically, the remote control ECU 80 detects the lever position of the remote controller 8 on the basis of a detection result of the lever position sensor 81. The remote control ECU 80 acquires operated tilt and trim on the basis of an operation of the user on a PTT switch 82.

The remote control ECU 80 is provided on a circuit board 80a. In other words, the CPU 801 and the photocouplers 813 to 816 are arranged on the same circuit board 80a.

The CPU 801 is connected to the engine ECU 31a (CPU 311) of the outboard motor 3a by the communication path 9a to convey a signal thereto. The CPU 801 is connected to the engine ECU 31b (CPU 311) of the outboard motor 3b by the communication path 9b to convey a signal thereto. The communication paths 9a and 9b accommodate CAN communication. In the CAN communication, a signal is transmitted and received by a differential voltage using two communication lines.

The CPU 801 is communicatively connected to the CAN I/F 805, the I/Fs 807 and 808, the driver 809, the I/F 810, the driver 811, and the I/F 812. The CPU 801 is connected to a potential of 5Ve and a potential of GND5.

The CAN I/F 805 receives and transmits a signal of CAN communication (control area network communication). In other words, the CAN I/F 805 receives a CAN signal from the indicator 11 through the hub 10 and transmits a signal to the CPU 801. The CAN I/F 805 receives a signal from the CPU 801 and transmits a CAN signal to the indicator 11 through the hub 10. The CAN I/F 805 is connected to a potential of 5Ve and a potential of GND5.

The power supply circuit 806 supplies electric power to the lever position sensor 81. The power supply circuit 806 is connected to a potential of 12Ve and a potential of GND5. The I/F 807 receives a signal containing lever position information from the lever position sensor 81 and transmits a signal to the CPU 801. The I/F 807 is connected to a potential of 5Ve and a potential of GND5. The I/F 808 receives a signal from the PTT switch 82 and transmits a signal to the CPU 801. The I/F 808 is connected to a potential of GND5.

The driver 809 receives a signal from the CPU 801 and drives an optical converter 813a of the photocoupler 813. The driver 809 is connected to a potential of 12Ve and a potential of GND5. The I/F 810 receives a signal from an electrical converter 814b of the photocoupler 814 and transmits a signal to the CPU 801. The I/F 810 is connected to a potential of 5Ve.

The driver 811 receives a signal from the CPU 801 and drives an optical converter 815a of the photocoupler 815. The driver 811 is connected to a potential of 12Ve and a potential of GND5. The I/F 812 receives a signal from an electrical converter 816b of the photocoupler 816 and transmits a signal to the CPU 801. The I/F 812 is connected to a potential of 5Ve.

According to the second embodiment, the photocouplers 813 and 814 are provided on the communication path 9a that connects the CPU 801 of the remote control ECU 80 and the engine ECU 31a to convey a signal therebetween. In other words, the communication path 9a that connects the CPU 801 and the engine ECU 31a conveys a signal while the CPU 801 and the engine ECU 31a are electrically separated (insulated) from each other by the photocouplers 813 and 814. The photocouplers 815 and 816 are provided on the communication path 9b that connects the CPU 801 of the remote control ECU 80 and the engine ECU 31b to convey a signal therebetween. In other words, the communication path 9b that connects the CPU 801 and the engine ECU 31b conveys a signal while the CPU 801 and the engine ECU 31b are electrically separated (insulated) from each other by the photocouplers 815 and 816. The photocouplers 813, 814, 815, and 816 include optical converters 813a, 814a, 815a, and 816a that convert electrical signals to optical signals and electrical converters 813b, 814b, 815b, and 816b that convert optical signals to electrical signals, respectively.

The photocoupler 813 outputs a signal from the CPU 801 to the CAN I/F 819. Specifically, the optical converter 813a converts an electrical signal output through the driver 809 from the CPU 801 to an optical signal. Then, the electrical converter 813b receives the optical signal output from the optical converter 813a, converts the optical signal to an electrical signal again, and outputs the electrical signal to the CAN I/F 819. The optical converter 813a of the photocoupler 813 connected to the CPU 801 is grounded (connected) to a potential of GND5. On the other hand, the electrical converter 813b of the photocoupler 813 connected to the engine ECU 31a is grounded (connected) to a potential of GND1.

The photocoupler 814 outputs a signal from the CAN I/F 819 to the CPU 801. Specifically, the optical converter 814a converts an electrical signal output through the driver 817 from the CAN I/F 819 to an optical signal. Then, the electrical converter 814b receives the optical signal output from the optical converter 814a, converts the optical signal to an electrical signal again, and outputs the electrical signal to the CPU 801 through the I/F 810. The electrical converter 814b of the photocoupler 814 connected to the CPU 801 is grounded (connected) to a potential of GND5. On the other hand, the optical converter 814a of the photocoupler 814 connected to the engine ECU 31a is grounded (connected) to a potential of GND1.

The photocoupler 815 outputs a signal from the CPU 801 to the CAN I/F 820. Specifically, the optical converter 815a converts an electrical signal output through the driver 811 from the CPU 801 to an optical signal. Then, the electrical converter 815b receives the optical signal output from the optical converter 815a, converts the optical signal to an electrical signal again, and outputs the electrical signal to the CAN I/F 820. The optical converter 815a of the photocoupler 815 connected to the CPU 801 is grounded (connected) to a potential of GND5. On the other hand, the electrical converter 815b of the photocoupler 815 connected to the engine ECU 31b is grounded (connected) to a potential of GND3.

The photocoupler 816 outputs a signal from the CAN I/F 820 to the CPU 801. Specifically, the optical converter 816a converts an electrical signal output through the driver 818 from the CAN I/F 820 to an optical signal. Then, the electrical converter 816b receives the optical signal output from the optical converter 816a, converts the optical signal to an electrical signal again, and outputs the electrical signal to the CPU 801 through the I/F 812. The electrical converter 816b of the photocoupler 816 connected to the CPU 801 is grounded (connected) to a potential of GND5. On the other hand, the optical converter 816a of the photocoupler 816 connected to the engine ECU 31b is grounded (connected) to a potential of GND3.

The driver 817 receives a signal from the CAN I/F 819 and drives the optical converter 814a of the photocoupler 814. The driver 817 is connected to a potential of 12Va and a potential of GND1. The driver 818 receives a signal from the CAN I/F 820 and drives the optical converter 816a of the photocoupler 816. The driver 818 is connected to a potential of 12Vc and a potential of GND3.

The CAN I/F 819 transmits and receives a signal of CAN communication. In other words, the CAN I/F 819 receives a CAN signal from the engine ECU 31a and transmits a signal to the CPU 801. The CAN I/F 819 receives a signal from the CPU 801 and transmits a CAN signal to the engine ECU 31a. The CAN I/F 819 is connected to a potential of 5Va and a potential of GND1.

The CAN I/F 820 transmits and receives a signal of CAN communication. In other words, the CAN I/F 820 receives a CAN signal from the engine ECU 31b and transmits a signal to the CPU 801. The CAN I/F 820 receives a signal from the CPU 801 and transmits a CAN signal to the engine ECU 31b. The CAN I/F 820 is connected to a potential of 5Vc and a potential of GND3.

The indicator 11 is connected to the remote controller 8 (remote control ECU 80) through the hub 10. The indicator 11 displays the state of the remote controller 8, the states of the outboard motors 3a and 3b, etc.

The remaining structure of the boat maneuvering system 200 according to the second embodiment is similar to that of the boat maneuvering system 100 according to the aforementioned first embodiment.

According to the second embodiment, the following effects are obtained.

According to the second embodiment, as hereinabove described, the photocouplers 813, 814, 815, and 816 including the optical converters 813*a*, 814*a*, 815*a*, and 816*a* that convert electrical signals to optical signals and the electrical converters 813*b*, 814*b*, 815*b*, and 816*b* that convert optical signals to electrical signals, respectively, are provided on the communication paths 9*a* and 9*b*, whereby electrical connection between both the engine ECU 31*a* that controls the outboard motor 3*a* and the engine ECU 31*b* that controls the outboard motor 3*b* and the CPU 801 of the remote controller 8 is disconnected, and hence the influence of a dielectric load, power generation noise, voltage fluctuations, etc. on the control signals is significantly reduced or prevented even in the case where the number of electronic components is increased. Thus, in the boat maneuvering system including a plurality of power sources, the reliability of communication environments of the control signals is further improved.

The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the remote controller is employed as the first operating device according to the present invention in each of the aforementioned first and second embodiments, the present invention is not restricted to this. According to the present invention, the first operating device may alternatively be an operating device other than the remote controller. The first operating device may be a joystick or the steering wheel, for example.

While the outboard motor(s) including the engine is employed as the power source(s) in each of the aforementioned first and second embodiments, the present invention is not restricted to this. According to the present invention, the power source(s) may alternatively be a power source(s) other than the outboard motor(s) or an outboard motor(s) including an electric motor(s).

While the present invention is applied to the boat maneuvering system in which the single outboard motor (power source) is provided in the aforementioned first embodiment and the present invention is applied to the boat maneuvering system in which the two outboard motors (power sources) are provided in the aforementioned second embodiment, the present invention is not restricted to this. The present invention may alternatively be applied to a boat maneuvering system in which three or more power sources are provided.

Figure 5:
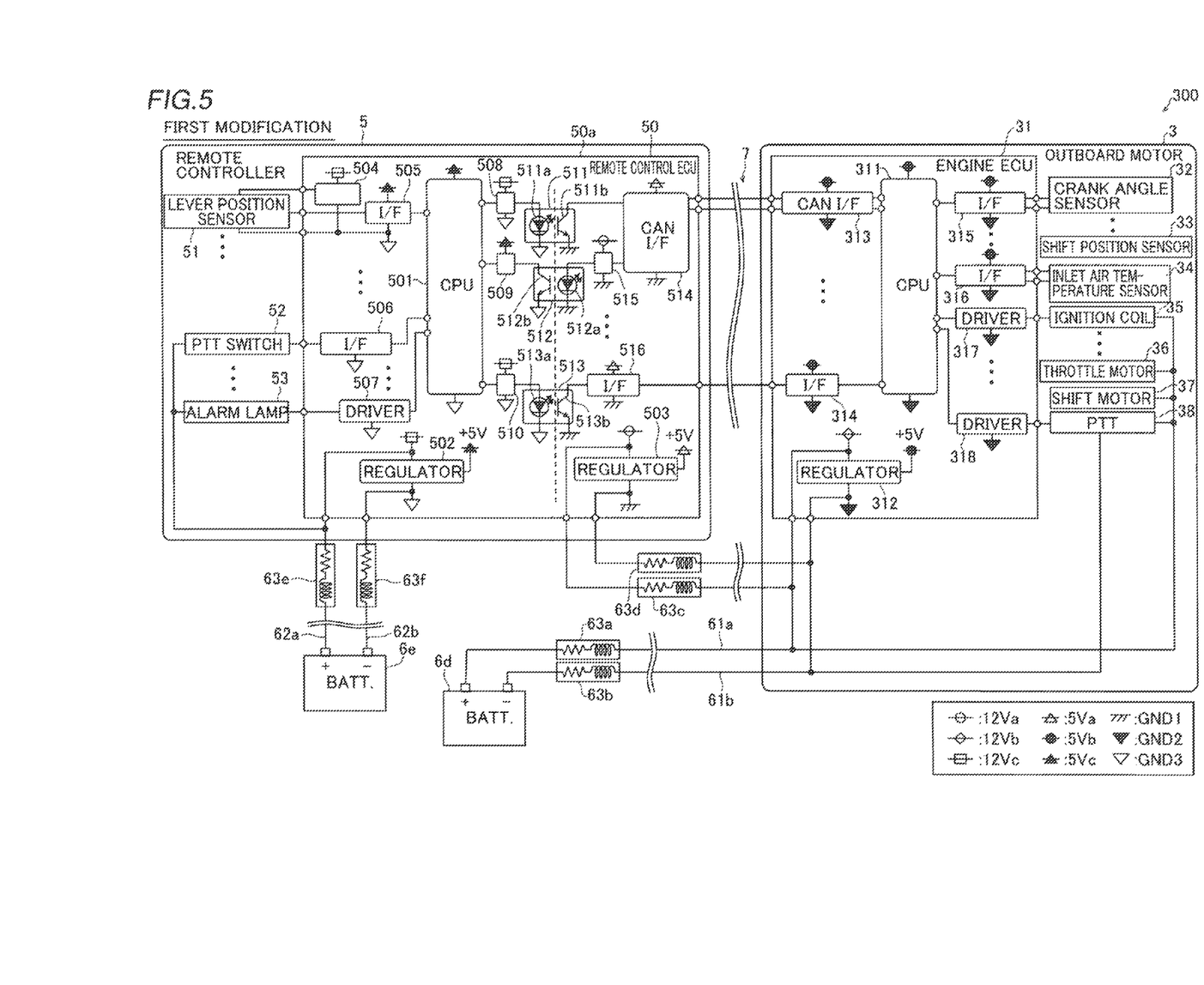
FIG. 5 is a circuit diagram schematically showing a boat maneuvering system according to a modification (first modification) of the first embodiment of the present invention.

While in the structure in which the single outboard motor 3 is provided, the engine ECU (first controller) and the CPU (second controller) of the remote control ECU are connected to the shared battery in the aforementioned first embodiment, the present invention is not restricted to this. According to the present invention, as in a first modification shown in FIG. 5, two batteries 6*d* and 6*e* may alternatively be provided, and an engine ECU 31 (first controller) and a CPU 501 (second controller) of a remote control ECU 50 may alternatively be connected to the separate batteries 6*d* and 6*e*, respectively. In other words, the battery 6*d* may be connected to an outboard motor 3 and a portion of the remote control ECU 50 including a CAN I/F 514 with respect to photocouplers 511 to 513. The battery 6*e* may be connected to a portion of the remote control ECU 50 including the CPU 501 with respect to photocouplers 511 to 513.

Figure 6:
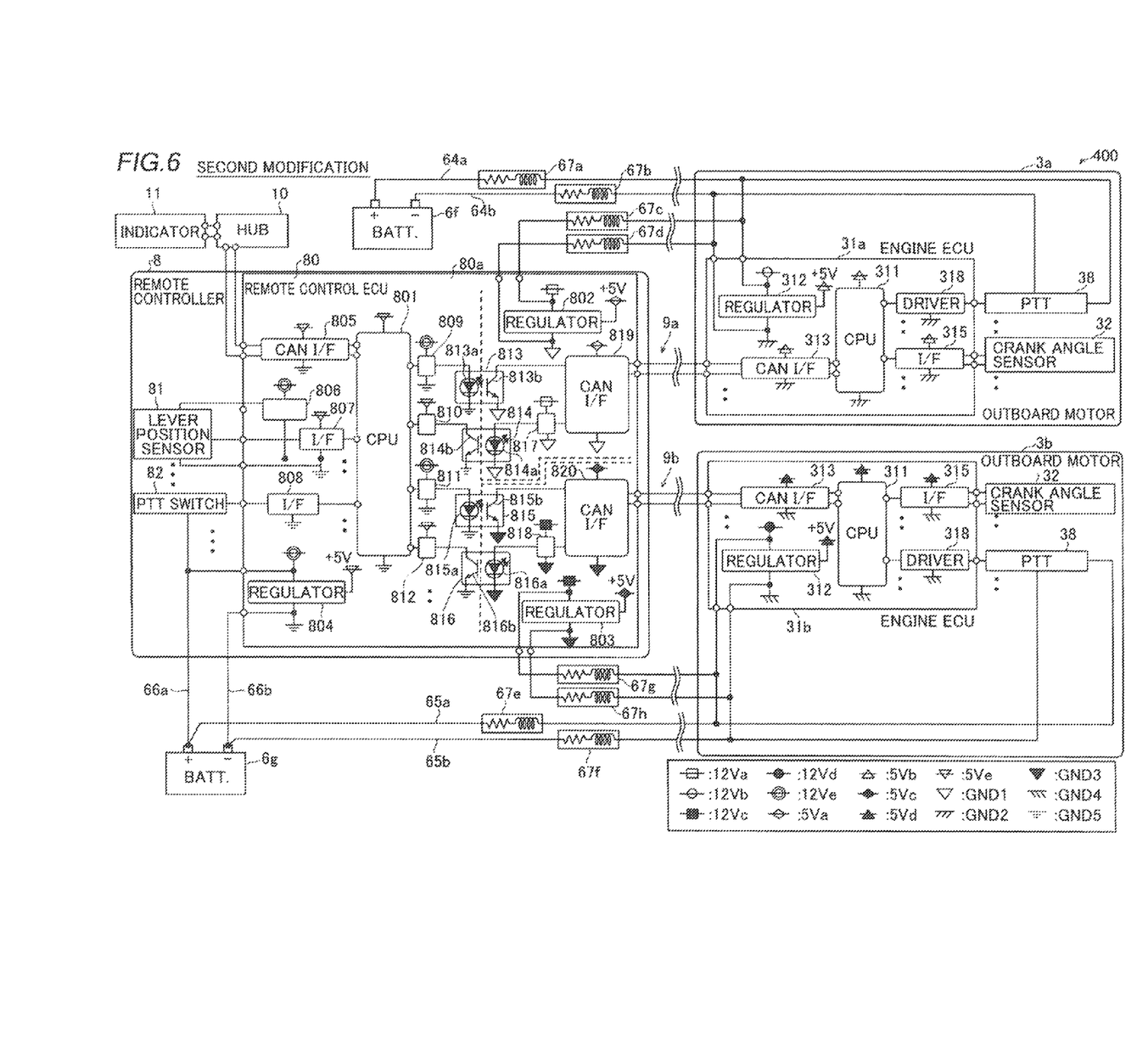
FIG. 6 is a circuit diagram schematically showing a boat maneuvering system according to a modification (second modification) of the second embodiment of the present invention.

While in the structure in which the two outboard motors 3*a* and 3*b* are provided, the engine ECU 31*a* (first controller), the engine ECU 31*b* (second controller), and the CPU 801 (third controller) of the remote control ECU 80 are connected to the batteries different from each other in the aforementioned second embodiment, the present invention is not restricted to this. According to the present invention, as in a second modification shown in FIG. 6, two batteries 6*f* and 6*g* may alternatively be provided, an engine ECU 31*a* (first controller) may alternatively be connected to the battery 6*f*, and an engine ECU 31*b* (second controller) and a CPU 801 (third controller) of a remote control ECU 80 may alternatively be connected to the shared battery 6*g*.

Figure 7:
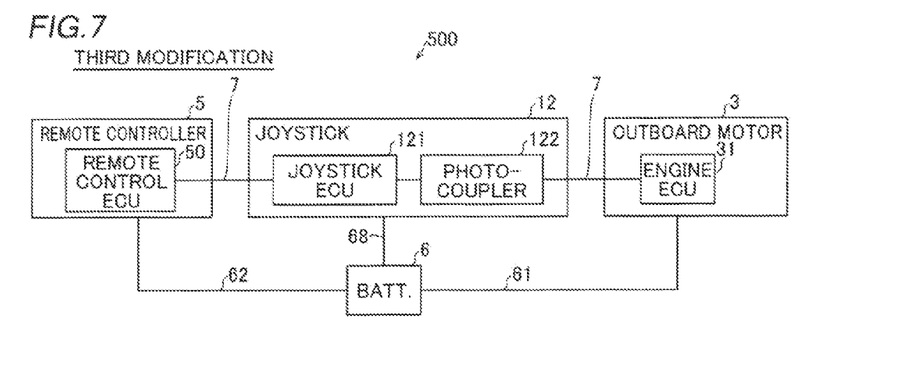
FIG. 7 is a block diagram schematically showing a boat maneuvering system according to another modification (third modification) of the first embodiment of the present invention.

While in the structure in which the single outboard motor 3 is provided, the remote controller and the outboard motor are connected to each other in the aforementioned first embodiment, the present invention is not restricted to this. According to the present invention, as in a third modification shown in FIG. 7, a joystick 12 may alternatively be provided between a remote controller 5 and an outboard motor 3. In this case, a remote control ECU 50 and a joystick ECU 121 may be connected to each other not through a photocoupler, and the joystick ECU 121 and an engine ECU 31 may be connected to each other through a photocoupler 122. In this case, the photocoupler 122 (signal conversion portion) may be integrally provided in the joystick 12. As shown in FIG. 7, the joystick 12 may be connected to a battery 6 by an electric power line 68, the remote controller 5 may be connected to the battery 6 by an electric power line 62, and electric power may be directly supplied from the battery 6 to the joystick 12 and the remote controller 5. Alternatively, the battery 6 and the joystick 12 may be directly connected to each other by an electric power line, the joystick 12 and the remote controller 5 may be connected to each other such that electric power is conveyed, electric power may be directly supplied from the battery 6 to the joystick 12, and electric power may be supplied from the battery 6 to the remote controller 5 through the joystick 12. Alternatively, the battery 6 and the remote controller 5 may be directly connected to each other by an electric power line, the remote controller 5 and the joystick 12 may be connected to each other such that electric power is conveyed, electric power may be directly supplied from the battery 6 to the remote controller 5, and electric power may be supplied from the battery 6 to the joystick 12 through the remote controller 5. The joystick 12 is an example of the "second operating device" in the present invention.

Figure 8:
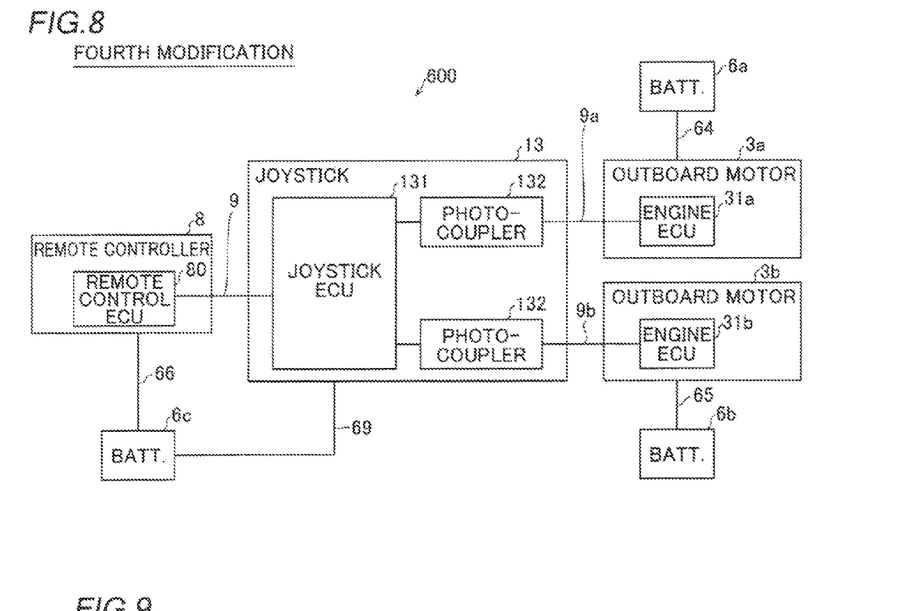
FIG. 8 is a block diagram schematically showing a boat maneuvering system according to another modification (fourth modification) of the second embodiment of the present invention.

While in the structure in which the two outboard motors 3*a* and 3*b* are provided, the remote controller and the outboard motors are connected to each other in the aforementioned second embodiment, the present invention is not restricted to this. According to the present invention, as in a fourth modification shown in FIG. 8, a joystick 13 may alternatively be provided between a remote controller 8 and both outboard motors 3*a* and 3*b*. In this case, a remote control ECU 80 and a joystick ECU 131 may be connected to each other not through a photocoupler, and the joystick ECU 131 and an engine ECU 31*a* (31*b*) of the outboard motor 3*a* (3*b*) may be connected to each other through a photocoupler 132. In this case, the photocoupler 132 (signal conversion portion) may be integrally provided in the joystick 13. As shown in FIG. 8, the joystick 13 may be connected to a battery 6*c* by an electric power line 69, the remote controller 8 may be connected to the battery 6*c* by an electric power line 66, and electric power may be directly supplied from the battery 6*c* to the joystick 13 and the remote controller 8. Alternatively, the battery 6*c* and the joystick 13 may be directly connected to each other by an electric power line, the joystick 13 and the remote controller 8 may be connected to each other such that electric power is conveyed, electric power may be directly supplied from the battery 6c to the joystick 13, and electric power may be supplied from the battery 6c to the remote controller 8 through the joystick 13. Alternatively, the battery 6c and the remote controller 8 may be directly connected to each other by an electric power line, the remote controller 8 and the joystick 13 may be connected to each other such that electric power is conveyed, electric power may be directly supplied from the battery 6c to the remote controller 8, and electric power may be supplied from the battery 6c to the joystick 13 through the remote controller 8. Alternatively, the joystick 13 may be connected to a battery 6a or 6b by an electric power line, and electric power may be supplied from the battery 6a or 6b to the joystick 13. The joystick 13 is an example of the "second operating device" in the present invention.

Figure 9:
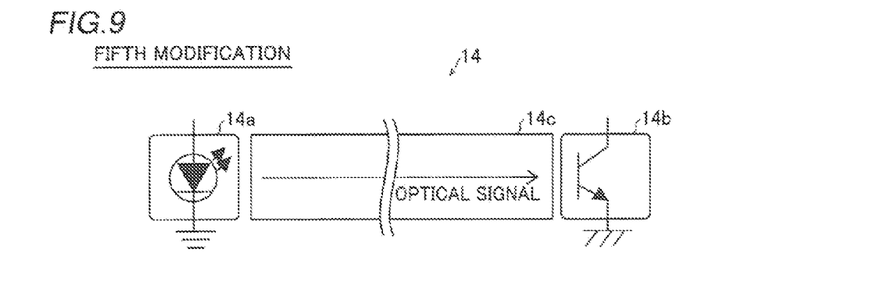
FIG. 9 is a block diagram showing a signal conversion portion of a boat maneuvering system according to a fifth modification of the first and second embodiments of the present invention.

While the photocouplers in which the optical converters and the electrical converters are integrally provided are employed as the signal conversion portions in each of the aforementioned first and second embodiments, the present invention is not restricted to this. According to the present invention, as in a fifth modification shown in FIG. 9, a signal conversion portion 14 may alternatively include an optical converter 14a, an electrical converter 14b, and an optical fiber 14c that guides an optical signal generated from the optical converter 14a to the electrical converter 14b. Thus, even in the case where a distance between the optical converter 14a and the electrical converter 14b is increased, light generated by the optical converter 14a reliably reaches the electrical converter 14b by the optical fiber 14c.

It should be understood, that the invention is not necessarily limited to the specific process, arrangement, materials and components shown and described above, but may be susceptible to numerous variations within the scope of the invention.

What is claimed is:

1. A boat maneuvering system for maneuvering a boat, comprising:
   a power source mountable on a body of the boat;
   a first operating device configured to operate the power source;
   a first controller, including a first central processing unit (CPU), configured to control the power source;
   a second controller, including a second CPU, configured to accept an operation instruction input from the first operating device and to output a control signal to the first controller;
   a first electric power line that connects the power source to a battery to convey electric power therebetween;
   a second electric power line that connects the second controller to the battery to convey electric power therebetween;
   a communication path that connects the first controller and the second controller to convey a signal therebetween; and
   a signal converter provided on the communication path to electrically separate the first and second controllers.

2. The boat maneuvering system according to claim 1, further comprising a first ground and a second ground that are different from each other, wherein
   the signal converter includes
      an optical converter configured to convert an electrical signal to an optical signal, and
      an electrical converter configured to convert the optical signal to another electrical signal,
   one of the optical converter and the electrical converter of the signal converter is connected to the first controller and is grounded to the first ground, and
   the other of the optical converter and the electrical converter of the signal converter is connected to the second controller and is grounded to the second ground.

3. The boat maneuvering system according to claim 1, wherein a larger current flows to the first electric power line than to the second electric power line.

4. The boat maneuvering system according to claim 1, wherein
   the battery includes a first battery and a second battery,
   the first controller and the power source are connected to the first battery, and
   the second controller is connected to the second battery.

5. The boat maneuvering system according to claim 1, wherein the battery is shared by the first controller, the power source and the second controller.

6. The boat maneuvering system according to claim 1, wherein the first operating device includes a remote controller.

7. The boat maneuvering system according to claim 1, wherein the signal converter includes a photocoupler.

8. The boat maneuvering system according to claim 7, wherein the photocoupler of the signal converter includes
   an optical converter configured to convert an electrical signal to an optical signal, and
   an electrical converter configured to convert the optical signal to another electrical signal.

9. The boat maneuvering system according to claim 8, wherein the signal converter further includes an optical fiber that guides the optical signal generated from the optical converter to the electrical converter.

10. The boat maneuvering system according to claim 1, wherein the signal converter is arranged on a same circuit board as the first controller or the second controller.

11. The boat maneuvering system according to claim 1, further comprising a second operating device provided separately from the first operating device in the communication path, wherein
    the signal converter is integrally provided in the second operating device.

12. The boat maneuvering system according to claim 11, wherein the second operating device includes a joystick.

13. A boat maneuvering system for maneuvering a boat, comprising:
    a first power source and a second power source mountable on a body of the boat;
    a first operating device configured to operate the first power source and the second power source;
    a first controller, including a first central processing unit (CPU), configured to control the first power source;
    a second controller, including a second CPU, configured to control the second power source;
    a third controller, including a third CPU, configured to accept an operation instruction input from the first operating device and to output control signals to the first controller and the second controller;
    a first electric power line that connects the first power source to a first battery to convey electric power therebetween;
    a second electric power line that connects the second power source to a second battery to convey electric power therebetween;

a third electric power line that connects the third controller to a third battery to convey electric power therebetween;
a first communication path that connects the first controller and the third controller to convey a signal therebetween;
a second communication path that connects the second controller and the third controller to convey a signal therebetween;
a first signal converter provided on the first communication path to electrically separate the first and third controllers; and
a second signal converter provided on the second communication path to electrically separate the second and third controllers.

14. The boat maneuvering system according to claim 13, further comprising a first ground, a second ground, and a third ground that are different from one another, wherein
the first signal converter includes
a first optical converter configured to convert a first electrical signal to a first optical signal, and
a first electrical converter configured to convert the first optical signal to another first electrical signal,
one of the first optical converter and the first electrical converter of the first signal converter is connected to the first controller and is grounded to the first ground,
the other of the first optical converter and the first electrical converter of the first signal converter is connected to the third controller and is grounded to the third ground,
the second signal converter includes
a second optical converter configured to convert a second electrical signal to a second optical signal, and
a second electrical converter configured to convert the second optical signal to another second electrical signal;
one of the second optical converter and the second electrical converter of the second signal converter is connected to the second controller and is grounded to the second ground, and
the other of the second optical converter and the second electrical converter of the second signal converter is connected to the third controller and is grounded to the third ground.

15. The boat maneuvering system according to claim 13, wherein
a larger current flows to the first electric power line than to the third electric power line, and
a larger current flows to the second electric power line than to the third electric power line.

16. The boat maneuvering system according to claim 13, wherein the third battery is shared as at least one of the first battery and the second battery.

17. The boat maneuvering system according to claim 13, wherein the first operating device includes a remote controller.

18. The boat maneuvering system according to claim 13, wherein
the first signal converter and the second signal converter respectively include a first photocoupler and a second photocoupler.

19. The boat maneuvering system according to claim 18, wherein
the first photocoupler of the first signal converter includes
a first optical converter configured to convert a first electrical signal to a first optical signal, and
a first electrical converter configured to convert the first optical signal to another first electrical signal; and
the second photocoupler of the second signal converter includes
a second optical converter configured to convert a second electrical signal to a second optical signal, and
a second electrical converter configured to convert the second optical signal to another second electrical signal.

20. The boat maneuvering system according to claim 19, wherein the first signal converter and the second signal converter each further include an optical fiber that guides the first or second optical signal generated from the first or second optical converter to the first or second electrical converter, respectively.

21. The boat maneuvering system according to claim 13, wherein the first signal converter is arranged on a same circuit board as the first controller or the third controller, and the second signal converter is arranged on a same circuit board as the second controller or the third controller.

22. The boat maneuvering system according to claim 13, further comprising a second operating device provided separately from the first operating device, and interposed in at least one of the first communication path and the second communication path, wherein
at least one of the first signal converter and the second signal converter is integrally provided in the second operating device.

23. The boat maneuvering system according to claim 22, wherein the second operating device includes a joystick.

* * * * *